April 10, 1962 W. F. LONGFIELD 3,028,825
APPARATUS FOR BLANKING PIECES FROM STRIP MATERIAL
Filed Dec. 28, 1956 10 Sheets-Sheet 1

Fig.1

INVENTOR.
WILLIAM F. LONGFIELD
BY
ATTORNEY

April 10, 1962  W. F. LONGFIELD  3,028,825
APPARATUS FOR BLANKING PIECES FROM STRIP MATERIAL
Filed Dec. 28, 1956  10 Sheets-Sheet 2

INVENTOR.
WILLIAM F. LONGFIELD
BY
ATTORNEY

April 10, 1962 W. F. LONGFIELD 3,028,825
APPARATUS FOR BLANKING PIECES FROM STRIP MATERIAL
Filed Dec. 28, 1956 10 Sheets-Sheet 4

Fig. 5

INVENTOR.
WILLIAM F. LONGFIELD
BY
ATTORNEY

Fig. 6

INVENTOR.
WILLIAM F. LONGFIELD

April 10, 1962 W. F. LONGFIELD 3,028,825
APPARATUS FOR BLANKING PIECES FROM STRIP MATERIAL
Filed Dec. 28, 1956 10 Sheets-Sheet 6

INVENTOR.
WILLIAM F. LONGFIELD
BY
ATTORNEY

Fig. 10

INVENTOR.
WILLIAM F. LONGFIELD
BY
ATTORNEY

Fig. 12

INVENTOR.
WILLIAM F. LONGFIELD

United States Patent Office 3,028,825
Patented Apr. 10, 1962

3,028,825
APPARATUS FOR BLANKING PIECES FROM STRIP MATERIAL
William F. Longfield, Warren, Ohio, assignor, by mesne assignments, to The McKay Machine Company, Youngstown, Ohio, a corporation of Ohio
Filed Dec. 28, 1956, Ser. No. 631,310
5 Claims. (Cl. 113—42)

The present invention relates to apparatus for blanking pieces from strip with a minimum of waste and the principal object of the invention is to provide new and improved methods and apparatus of the character described.

In the past, apparatus has been employed which blanks pieces from strip material and which operates in conjunction with a cyclically operated device such as, for example, a press or the like to discharge such pieces to the latter. However, such prior art apparatus has been wasteful of material and/or has been of a complex troublesome construction.

The present invention is highly advantageous in that it provides for blanking pieces from strip with a minimum of scrap and for discharging such pieces to a cyclically operated device in accordance with the latter's needs. This is accomplished by means which are relatively simple and troublefree in operation. Other advantages will readily become apparent from a study of the following description and from the drawings appended hereto.

In the drawings accompanying this specification and forming a part of this application there is shown, for purposes of illustration, an embodiment which the invention may assume, and in these drawings.

It is a well-known phenomenon that in blanking a single row of more or less round pieces from strip material, considerable waste or scrap results even though the width of the strip is barely greater than the size of the pieces to be blanked and even though a bare minimum of material is left between adjoining blanked pieces. It is also well known that the amount of scrap can be reduced by blanking more than one row of pieces across the strip, particularly if the pieces of each row are staggered from, or nested between, the pieces of the adjoining rows. When blanking more than one row of pieces from strip, it is customary to blank a plurality of pieces at one time and in such a pattern that at least one piece will be blanked from each row. In this way, it is not necessary to effect relative movement of the strip and the blanking means in a direction edgewise of the strip in order to obtain complete coverage.

Broadly, the present invention blanks pieces from strip material with a minimum of scrap and discharges such pieces to a press or other device. More specifically, the present invention substantially simultaneously blanks a greater number of pieces from the strip than can be used at one cycle of operation of the device with which it is associated, stores the blanked pieces until they are required by the device and discharges such pieces sequentially to the device in timed relation with the latter's operating cycles before blanking a number of pieces again.

Figure 1:
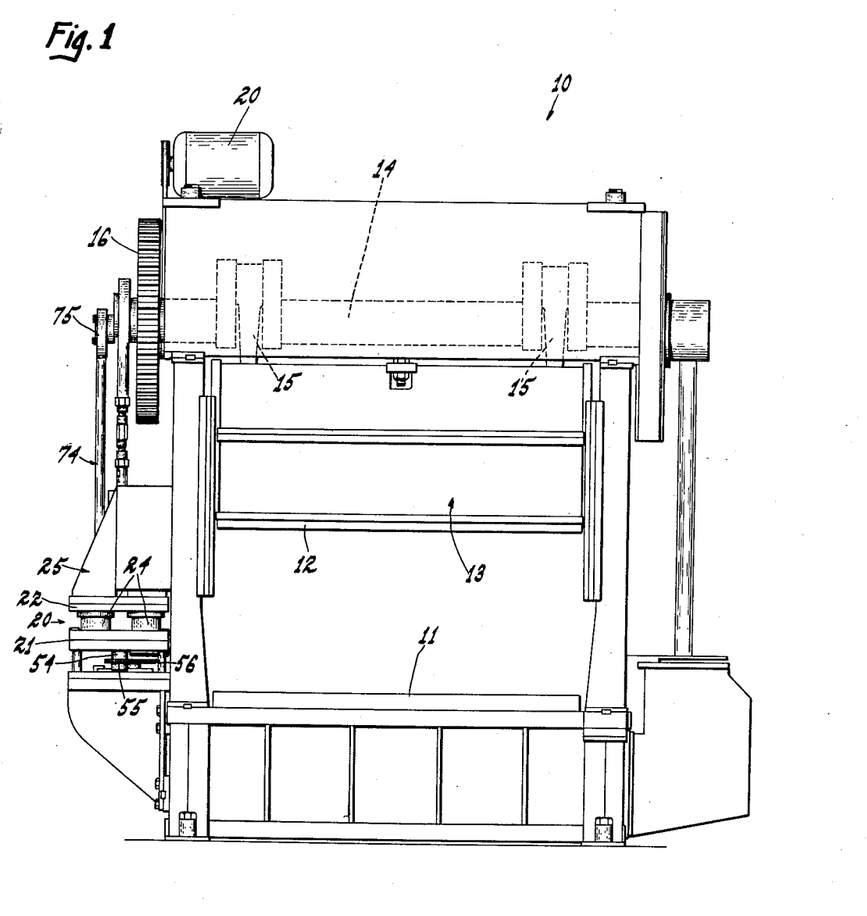
FIGURE 1 is a front elevational view of a press embodying the present invention.

The present invention is adapted for use with a cyclically operated device which, in the embodiment herein disclosed, comprises a press 10 having a fixed lower platen 11 and a movable upper platen 12 carried by a vertically reciprocable slide 13 (see FIGURE 1). Although not shown, it will be understood that the respective platens will carry suitable die parts or the like which cooperate to perform certain operations on pieces of material fed thereto.

By way of illustration, it may be assumed that the die parts carried by respective platens are arranged to progressively preform a series of drawing operations on round, sheet metal blanks. Each time press slide 13 descends, the die parts at the left hand side of the press perform an initial operation on a blank and the die parts at the right hand side of the press perform a final operation on a piece which has progressed from left to right through the intermediate die parts. Any well-known means may be employed to progressively transfer the pieces from one stage of operation to the next successive stage and to discharge the pieces from the final stage.

Slide 13 is adapted to be reciprocated by a rotatably supported crankshaft 14 to which the slide is connected by means of connecting rods 15. The crankshaft carries a bull gear 16 in mesh with a pinion 17 carried by a countershaft 18. The countershaft carries a flywheel 19 which is driven by a suitable drive motor 20. A suitable clutch, not shown, may be interposed between the flywheel 19 and the countershaft 18 to control driving engagement between the motor and the press.

As previously mentioned, the present invention provides for blanking pieces from strip material and for discharging such pieces to the press in accordance with the latter's requirements. In the instant embodiment, the following construction is employed for carrying out the foregoing.

Figure 13:
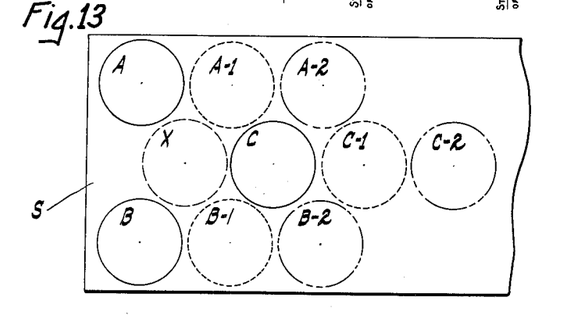
FIGURE 13 is a plan view of strip material following a blanking operation.

For blanking pieces from the strip, there is employed a blanking die 20 having a fixed lower die portion 21 and a movable upper die portion 22. As seen in FIGURE 13, it is preferable to blank three rows of pieces from the strip S and to substantially simultaneously blank one piece from each row. Accordingly, lower die portion 21 has three apertures 23 therein (see FIGURE 8) while upper die portion 22 has three punches 24 aligned with respective apertures. Each aperture and punch is so proportioned that when the strip S is positioned between the respective die portions and the punches are forced into respective apertures, each punch will blank a piece from the strip and such pieces will drop through the apertures in die portion 21 to be intercepted by means later to be disclosed.

If blanking die 20 were arranged to punch pieces A, B and X from the strip (see FIGURE 13) die portion 21 would be extremely weak because of the closeness of apertures 23. Accordingly, the blanking die is arranged to punch pieces A, B and C from the strip so as to provide a die of sufficient strength and rigidity. For reasons later to become clear, pieces A, B and C are arranged radially about a center and are spaced equally thereabout.

Figure 2:
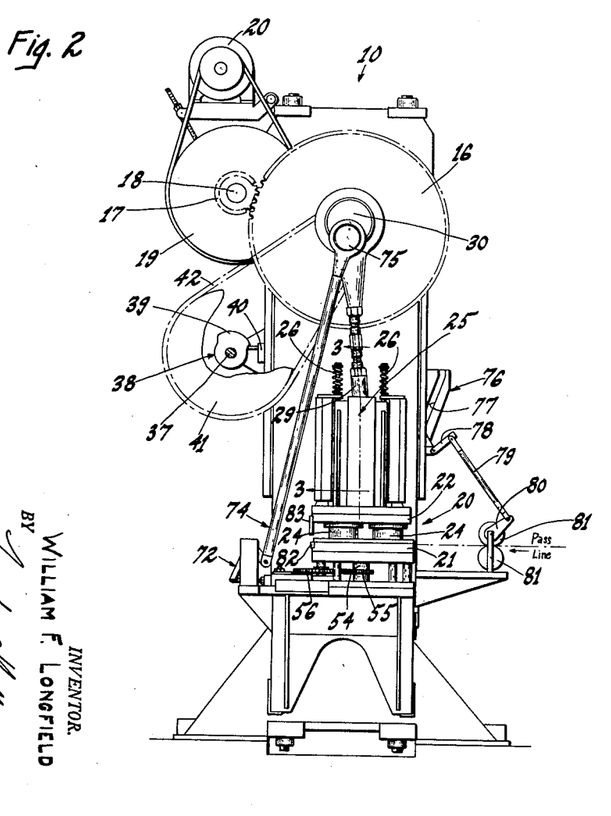
FIGURE 2 is a side elevational view thereof.

Upper die portion 22 is carried for movement toward and away from the fixed lower die portion 21 by means of a reciprocably mounted blanking slide 25 (see especially FIGURE 2). A pair of springs 26 resiliently maintain the blanking slide in the uppermost position shown in FIGURES 1, 2 and 8. This slide is adapted to be driven by crankshaft 14 in a manner to be disclosed; however, since the press of the present embodiment requires but one blank for each revolution of the crankshaft while the blanking die 20 makes three blanks everytime it operates, the following means are provided to effect movement of the blanking slide and consequent operation of the blanking die only once for each three revolutions of the crankshaft.

Figure 3:
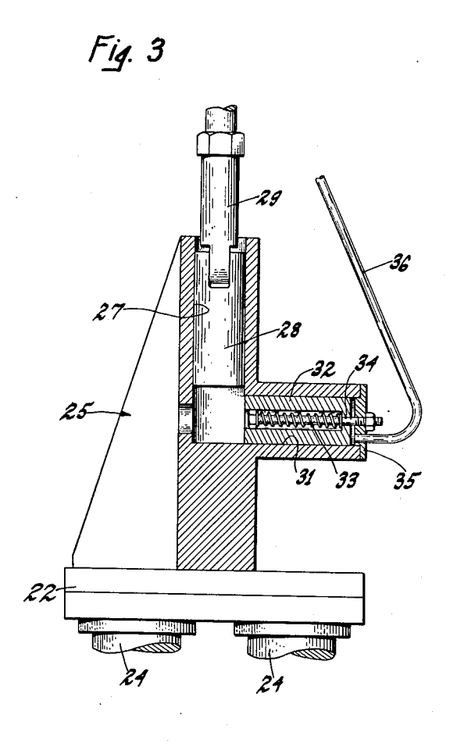
FIGURE 3 is an enlarged, fragmentary sectional view generally corresponding to the line 3—3 of FIGURE 2.

As best seen in FIGURE 3, blanking slide 25 has a vertically disposed bore 27 in which a plunger 28 is slideable. Pivotally connected to plunger 28 is the lower end of a link 29 whose upper end is rotatable on an eccentric portion 30 (see FIGURE 2) of crankshaft 14. Extending transversely and intercepting bore 27 is a bore 31 in which a piston 32 is slideable. Piston 32 is preferably hollow and contains a spring 33 whose one end bears against the piston and whose other end bears against the head of a bolt 34 whose shank passes through the spring and through an aperture in the piston and whose opposite end is anchored to a cover 35 which closes the right-hand end of bore 31.

As illustrated, spring 33 normally maintains piston 32 in the position shown wherein it will not interfere with reciprocation of plunger 28 in bore 27 so that reciprocation of the plunger as the crankshaft rotates will not effect movement of the blanking slide. However, when fluid pressure is admitted to the right-hand end of bore 31 through a conduit 36 which is connected to a valve later to be described, the piston will be moved to the left across the path of plunger 28. With the crankshaft rotating and moving plunger 28 downwardly, the plunger will engage the piston disposed across its path and thereupon further downward movement of the plunger will carry the blanking slide downwardly therewith against the urging of springs 26. As the crankshaft moves the plunger upwardly, springs 26 will cause the blanking slide to follow the plunger upwardly until the slide reaches its uppermost position again.

As previously mentioned, a valve is employed to control flow of fluid to and from bore 31 via conduit 36 and in the present embodiment, such valve is actuated by a cam driven in timed relation with the crankshaft 14. As shown in FIGURE 2, a camshaft 37 is rotatably mounted on the frame of the press and carries a cam 38 having a lobe 39. A suitable valve 40 has its actuator engaged with the cam and although not shown, this valve is connected with conduit 36 and with a suitable source of fluid pressure. Camshaft 37 carries a sprocket 41 and a suitable chain 42 connects this sprocket with one carried by the crankshaft 14.

In the present embodiment, the relationship of the respective sprockets is such that camshaft 37 is rotated once for every three revolutions of crankshaft 14. Valve 40 is so arranged that when its actuator is shifted by lobe 39 of the cam 38, fluid under pressure is admitted to bore 31 to move piston 32 to the left across the path of plunger 28. Upon rotation of cam 38 an amount whereby lobe 39 moves out of engagement with the actuator of valve 40, fluid will be exhausted from bore 31 to permit the piston to return to its original position.

With the construction thus far described, rotation of crankshaft 14 through one revolution will effect a cycle of operation of the press and also a cycle of operation of the blanking die. The crankshaft will then rotate through the next two revolutions and effect two more cycles of the press without effecting a cycle of the blanking die. At the next revolution of the crankshaft, the blanking die will once again operate through a cycle of operations.

Figure 8:
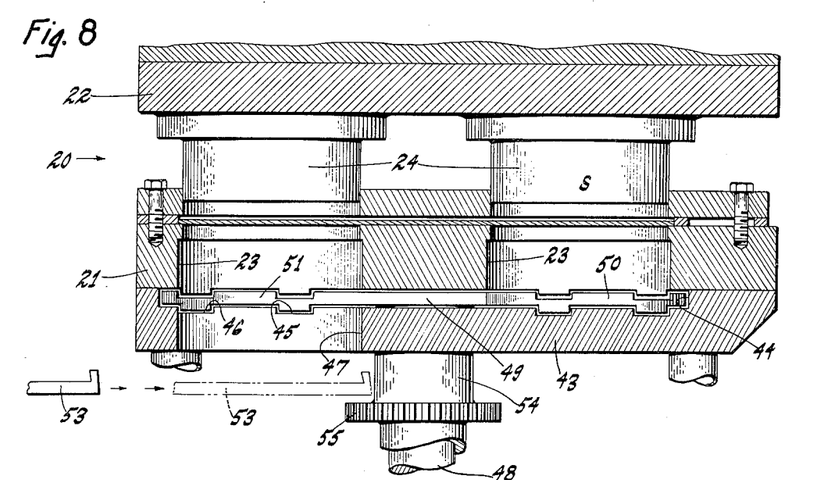
FIGURE 8 is a sectional view generally corresponding to the line 8—8 of FIGURE 4.
Figure 9:
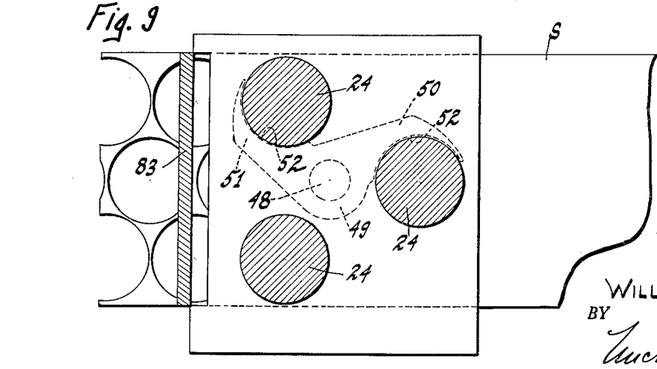
FIGURE 9 is a reduced size sectional view generally corresponding to the line 9—9 of FIGURE 4.

As previously mentioned, when the pieces are blanked from the strip, they fall through respective apertures 23 in die portion 21 and are intercepted by means provided for this purpose. As best shown in FIGURE 8, a plate 43 underlies die portion 21 of the blanking die. This plate has a circular depression 44 into which certain of the blanked pieces fall and whose center coincides with the center about which apertures 23 of die portion 21 and the punches 24 are arranged. The bottom of this depression has a pair of concentric annular grooves 45, 46 for a purpose to appear. An aperture 47 is formed in plate 43 of a size to pass the blanked pieces and this aperture is in alignment with one of the apertures 23 in die portion 21.

Figure 10:
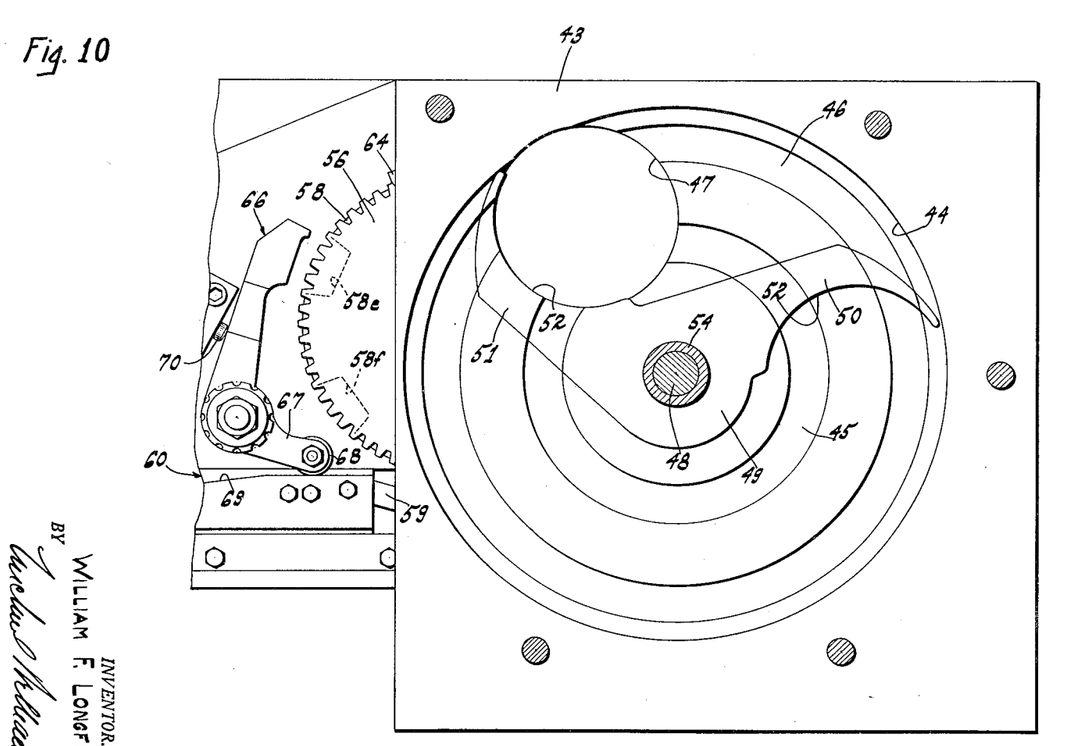
FIGURE 10 is an enlarged view similar to FIGURE 9 but with certain parts removed to show the underlying structure.
Figure 11:
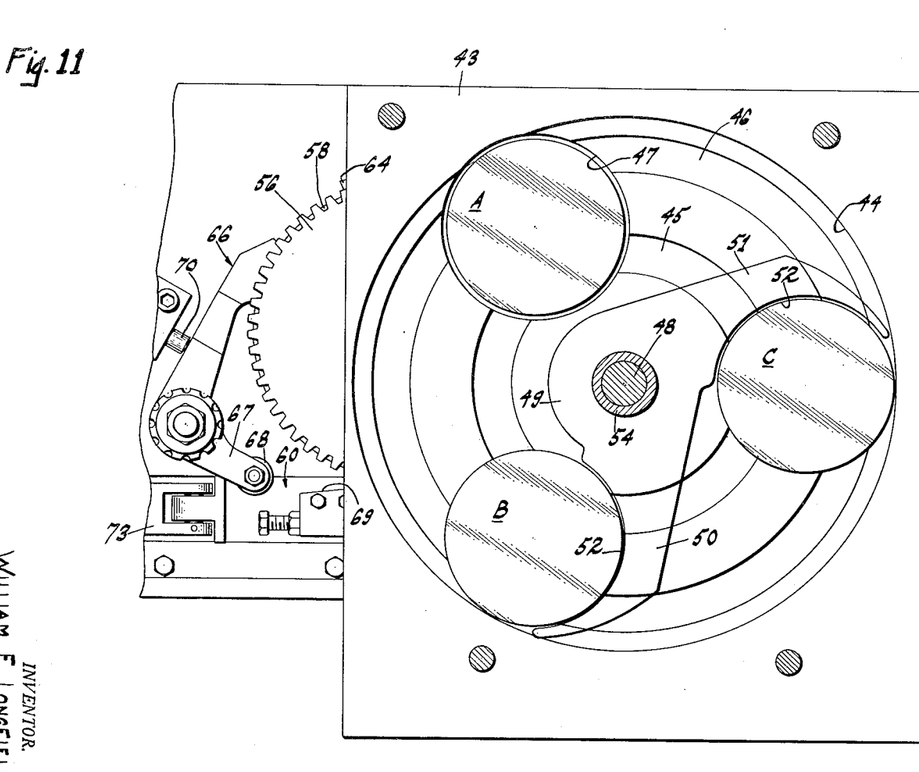
FIGURES 11 and 12 are views similar to FIGURE 10 but showing the parts at other positions.
Figure 12:
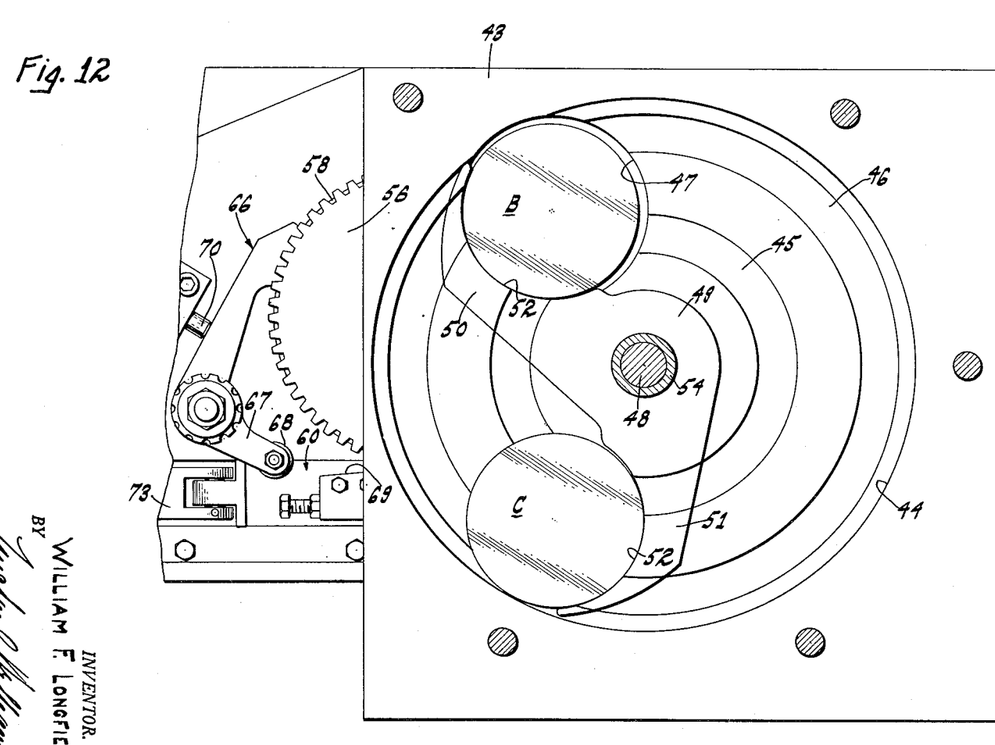

Rotatable in depression 44 and about the axis of a shaft 48 is a hub 49 having a pair of arms 50, 51 extending radially therefrom (see also FIGURES 10, 11 and 12). Each arm has an arcuate portion 52 which forms a pocket in which respective blanked pieces, resting in depression 44, seat. By means later to be disclosed, when the arms are rotated in a clockwise direction, they will slide the pieces around in depression 44 until such pieces arrive at aperture 47 in plate 43 and fall therethrough. It will be noted that arms 50, 51 have depending portions in register with and disposed within annnular grooves 45, 46 to insure that the pieces cannot become wedged beneath the arms. The lower facing surface of die part 21 preferably has a pair of depending annular ridges which cooperate with grooves in the upper surface of the arms to insure against a piece becoming wedged above the arms.

Still referring to FIGURE 8, there is fragmentarily shown a carriage 53 which catches the blanked pieces as they are discharged through aperture 47 in plate 43 and which transfers such pieces to the first stage die (not shown) of the press. This carriage may also have portions which transfer the pieces progressively along the respective press dies as before mentioned. By means of any suitable mechanism, carriage 53 is adapted to be reciprocated in timed relation with the crankshaft of the press from the full line position shown, wherein it has transferred a piece to the press, to the dot-dash line position wherein it is ready to receive a piece discharged through aperture 47.

Figure 7:
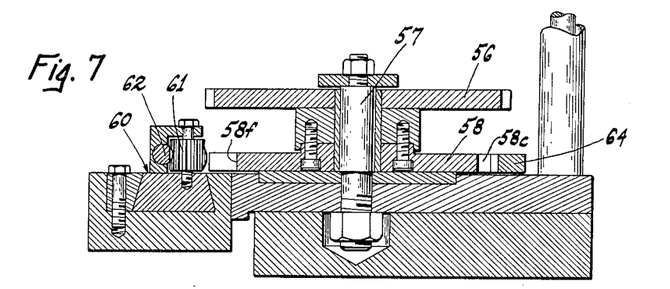
FIGURE 7 is a sectional view generally corresponding to the line 7—7 of FIGURE 6.

The means provided for effecting rotation of arms 50, 51 in timed relation with the rotation of crankshaft 14 comprises the following: Hub 49 from which arms 50, 51 extends, is secured to a sleeve 54 which is rotatable about the axis of shaft 48. Also secured to sleeve 54 but in axially spaced relation to hub 49 and positioned beneath plate 43 is a gear 55 (see FIGURES 5 and 8). Gear 55 meshes with a gear 56 which is rotatable about a spindle 57 (see especially FIGURE 7). Secured to and rotatable with gear 56 is a disc 58 which, in the present embodiment, has peripheral notches 58a, 58b, 58c, 58d, 58e, and 58f.

Figure 5:
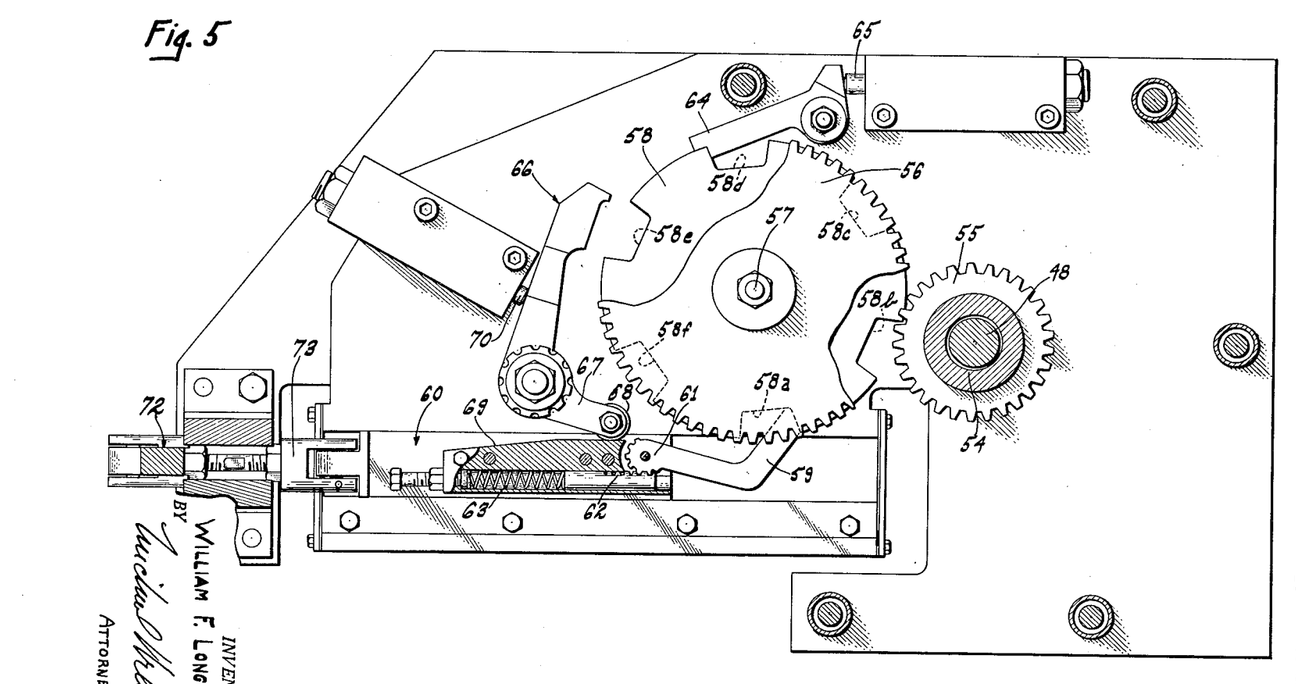
FIGURE 5 is a sectional view generally corresponding to the line 5—5 of FIGURE 4, certain portions being broken away to show underlying structure.

In the position of parts shown in FIGURE 5, a dog 59 is seated in notch 58a, such dog being carried by a reciprocable slide 60. Means are provided to resiliently urge this dog toward engagement with the disc and at the present time, the dog has a gear sector 61 which engages with a rack 62. A spring 63 resiliently urges the rack in a direction to urge the dog to engagement with the disc.

Engaged with notch 58d of disc 58 is a pivotally mounted dog 64 which is urged toward the disc by means of a plunger 65 backed up by a spring (not shown). Dog 64 prevents rotation of disc 58 in one direction but permits rotation of the disc in the opposite direction as will be evident.

Figure 6:
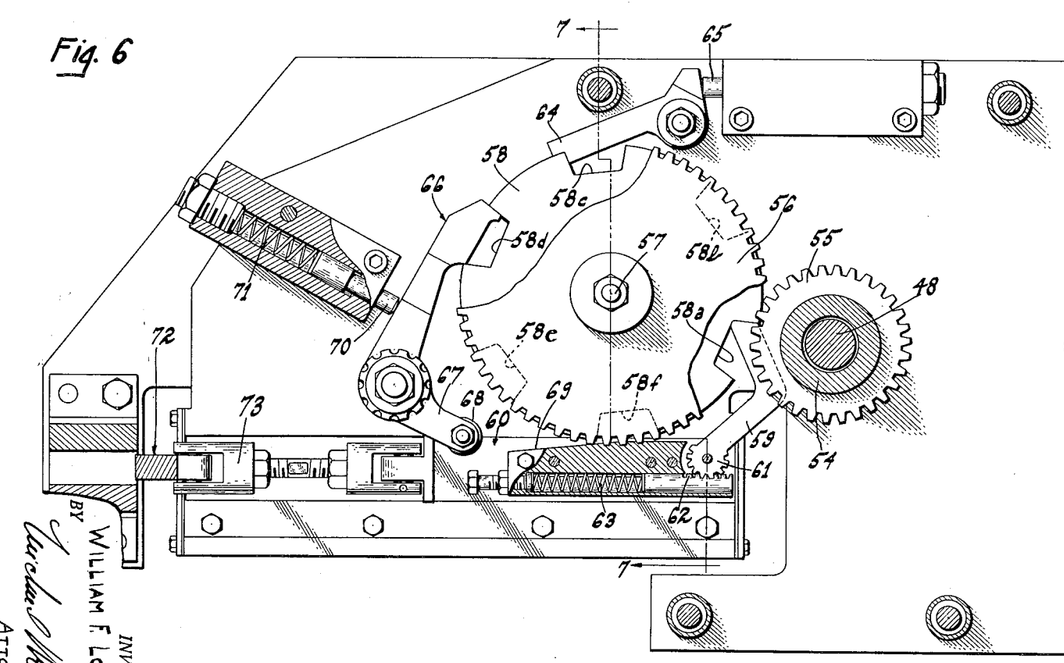
FIGURE 6 is a view similar to FIGURE 5 but with certain parts in another position.

Means are provided for locating and locking disc 58 in predetermined positions and such means comprises a pivotally mounted dog 66 having an arm 67 which carries a roller 68. In the position of parts shown in FIGURE 5, roller 68 is in engagement with a cam-like surface 69 provided by a portion of slide 60 so as to hold dog 66 away from the disc. A plunger 70 backed up by a spring 71 (see FIGURE 6) urges dog 66 toward the disc.

Figure 4:
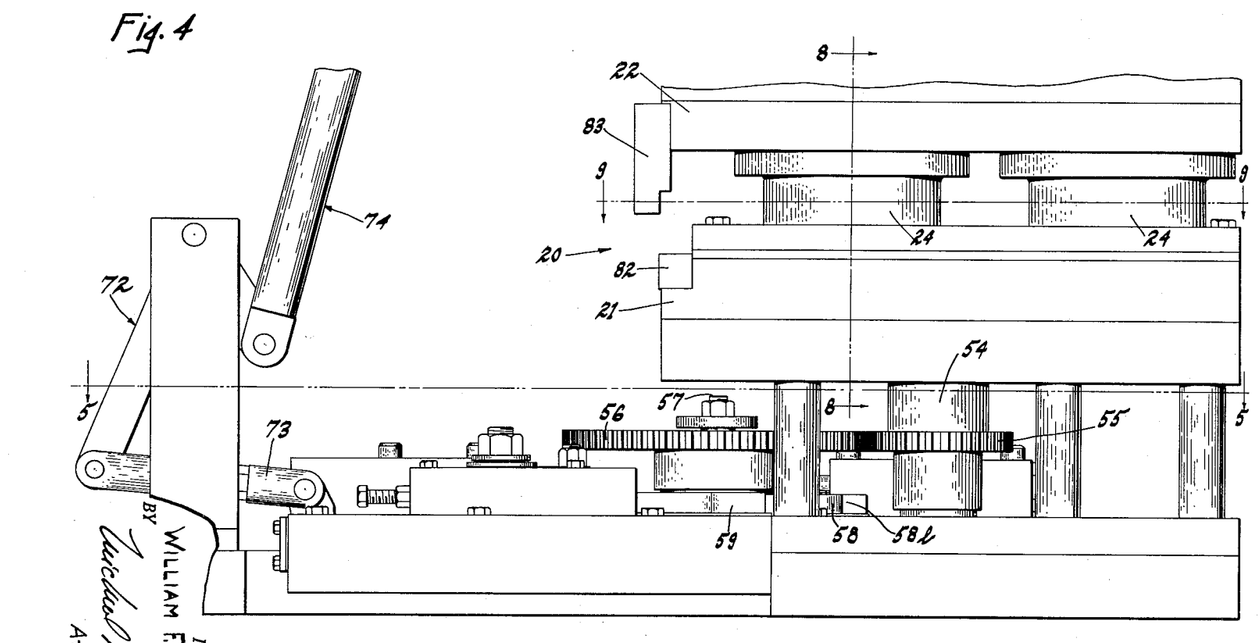
FIGURE 4 is an enlarged view of a portion of the apparatus shown in FIGURE 2.

For effecting reciprocation of slide 60, one arm of a pivotally mounted bell-crank lever 72 is attached to the slide by an adjustable length link 73 (see FIGURES 4, 5 and 6) while the other arm of the bell-crank lever is pivotally attached to the lower end of a link 74 whose upper end is rotatable upon an eccentric portion 75 (see FIGURE 2) of crankshaft 14. From the foregoing, it will be understood that rotation of the crankshaft will effect reciprocation of slide 60 between the respective positions illustrated in FIGURES 5 and 6.

With reference to FIGURE 2, means are provided for feeding strip to the blanking die in timed relation with the cycles of the press and with the blanking die. In the present embodiment, slide 13 of the press carries an upright plate 76 in which is formed an upright cam slot 77 which is inclined for a purpose to appear. A pivotally mounted bell-crank lever 78 has one arm provided with a roller which rides in slot 77 while the other arm of the lever is pivotally connected to one end of a link 79. The other end of link 79 is pivotally connected to an arm 80 which is operably connected to a pair of pinch rolls 81 by means of a suitable ratchet mechanism (not shown).

When the press slide 13 descends from its uppermost position shown, bell-crank 78 will be rotated in a clockwise direction, because the roller which it carries is disposed in cam slot 77 to thereby rotate lever 80 in a clockwise direction. Rotation of lever 80 in this direction will effect rotation of pinch rolls 81 to thereupon feed a predetermined length of strip to the blanking die. During upward movement of the slide, lever 80 will be rotated in the opposite direction; however, the ratchet mechanism associated with lever 80 and pinch rolls 81 will permit this reverse movement of the lever without effecting a reverse rotation of the pinch rolls. It is to be understood that the cam is preferably so arranged that rotation of the pinch rolls 81 will be terminated immediately prior to the time the blanking die 20 blanks pieces from the strip.

Figure 14:
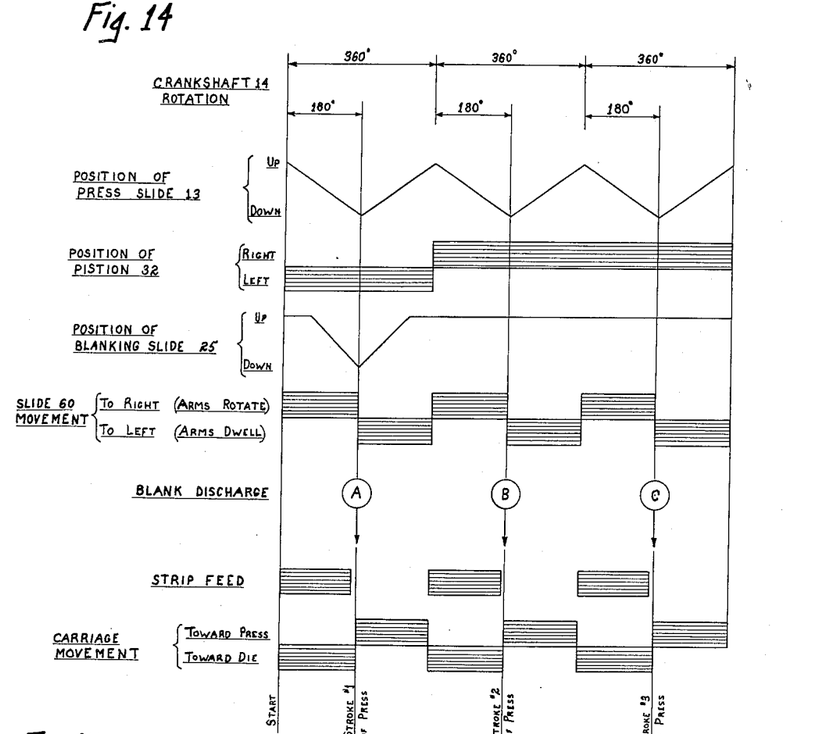
FIGURE 14 is a graph which illustrates the sequence of operations of the various parts and their inter-relationship with each other.

With slide 13 of the press in its uppermost position shown in FIGURES 1 and 2, blanking slide 25 will also be in its uppermost position shown. Arms 50, 51 will be in the position shown in FIGURE 10 while slide 60 and its associated parts will be positioned as shown in FIGURE 5. Assuming that drive motor 20 is rotating and that the strip to be blanked is positioned between the pinch rolls 81 and between the blank die portions 21, 22, the clutch (not shown) may be engaged to effect rotation of bull gear 16 of the press in the direction indicated in FIGURE 2 and consequent rotation of the press crankshaft 14. In following the about to be described sequence of operations, it will be helpful to refer to the graph shown in FIGURE 14.

As the crankshaft rotates and begins to move slide 13 downwardly, link 29 will begin to move downwardly and link 74 will begin to move upwardly. This rotation of the crankshaft will rotate cam 38 and cause its lobe 39 to shift the actuator of valve 40. Valve 40 will thereupon admit fluid pressure to bore 31 (see FIGURE 3) to thereby move piston 32 to the left across the path of the plunger 28 which is descending under the impetus of downwardly moving link 29. Upon engagement of plunger 28 with piston 32, continued downward movement of link 29 will be translated to downward movement of blanking slide 25 and corresponding downward movement of the punch-carrying blanking die portion 22.

During the initial descent of slide 13, strip will be fed to the blanking die as before described.

As press slide 13 descends, carriage 53 will move from its full line position shown in FIGURE 8 to arrive at its dot-dash line position as the press slide and the blanking slide reach their respective lowermost positions.

As previously mentioned, downward movement of press slide 13 will be accompanied by an upward movement of link 74. Upward movement of link 74 will effect movement of slide 60 from the position shown in FIGURE 5 to the position shown in FIGURE 6 at which time press slide 13 will have reached its lowermost position and link 74 will have reached its uppermost position. As slide 60 moves to the right, dog 59 will effect rotation of disc 58, gears 56, 55 and consequent rotation of arms 50, 51 from the position shown in FIGURE 10 to the position shown in FIGURE 11. Note that as slide 60 approaches the position shown in FIGURE 6, roller 68 of dog 66 will fall off the cam surface 69 of the slide to permit dog 66 to be resiliently urged into recess 58d when such recess becomes aligned with the dog. This will accurately locate and lock the arms in the position shown in FIGURE 11.

When blanking slide 25 reaches the bottom of its stroke, three pieces A, B and C (see FIGURE 13) will be blanked from the strip. Piece A will fall straight through aperture 47 in plate 43 (see FIGURE 8) and come to rest on carriage 53 which, it will be recalled, is in its dot-dash line position at this time. Pieces B and C will come to rest on the floor of recess 44 in position for reception in the arcuate pocket portions 52 of respective arms 50, 51.

As crankshaft 14 continues to rotate, press slide 13 and blanking slide 25 will move upwardly while link 74 will move downwardly. Movement of link 74 downwardly will effect retraction of slide 60 to the position shown in FIGURE 5 once again at which time the press slide will be in its uppermost position. It will be noted that during the retraction of slide 60, disc 58, gear 56, 55 and arms 50, 51 will remain in the position shown in FIGURES 6 and 11 until the press slide moves downwardly again.

As the blanking slide 25 approaches or reaches its uppermost position, the actuator of valve 40 will fall off the lobe 39 of the cam 38 which, as before described, rotates with the crankshaft. This will exhaust fluid from bore 31 and permit spring 33 to return piston 32 to the position shown in FIGURE 3. During the upward movement of the press slide, carriage 53 will transport piece A to the first stage die (not shown) of the press.

As the press slide 13 starts down on its second stroke, strip will once again be fed to the blanking die during at least the initial portion of slide movement. The blanking slide 25, however, will remain in its uppermost position because cam 38 has not been rotated sufficiently to move the actuator of valve 40 to thereupon admit fluid pressure to bore 31 to shift piston 32 to the left. Since piston 32 remains at this time in the position shown in FIGURE 3, plunger 28 will merely move down in bore 27 without effecting movement of the blanking slide.

Downward movement of the press slide once again will be accompanied by upward movement of link 74 which will effect movement of slide 60 to the right to thereupon rotate arms 50, 51, as heretofore described, from the position shown in FIGURE 11 until they reach the position shown in FIGURE 12, at which time slide 13 will be in its lowermost position. During this downward movement of the press slide, it will be understood that the first blanked piece A has been subjected to the working of the first stage die (not shown) and that carriage 53 has been returning to the blanking die to receive a previously blanked piece which has been stored until it was required by the press. As arm 50 moves to the position shown in FIGURE 12, it carries piece B to alignment with aperture 47 in plate 43 whereupon the piece falls on to carriage 53 which is now positioned beneath the aperture. Return movement of the press slide to its uppermost position transfer piece B to the press and returns slide 60 to the position shown in FIGURE 4.

Downward movement of the press slide once again on its third stroke is merely a repetition of the above described second stroke; however, as the press slide reaches its lowermost position again, arm 51 will have been rotated completely around so as to discharge piece C onto the carriage 53. Return movement of the press slide to its uppermost position will transfer piece C to the press in readiness for the next stroke thereof.

The next stroke of the press will be a repetition of the first stroke; that is, the blanking slide 25 will once again move down to blank three more pieces from the strip. As illustrated in FIGURE 13, the strip will have been fed by the pinch rolls an aggregate amount so that blanks A–1, B–1 and C–1 will be punched from the strip at the places indicated at this stroke. Following the discharge of piece C–1, the blanking slide will move down once again to blank pieces A–2, B–2 and C–2 from the strip at the places indicated and the foregoing operations will progress as long as desired or until the strip being blanked has been consumed.

In order to prevent interference between the waste material and certain operating parts such as link 74, die portions 21, 22 may carry respective knives 82, 83 (see FIGURE 4) which sever the waste strip into short, easily disposed of pieces each time the blanking slide moves down.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. Blanking apparatus comprising a pair of platens vertically movable toward and away from each other, the upper platen providing a plurality of punches arranged radially about a center and said lower platen having a plurality of die apertures for closely receiving respective punches, movement of said platens towards each other effecting movement of said punches through material disposed between said platens and movement of said punches into respective die apertures to respectively punch a piece of material therethrough, means underlying said die for supporting the pieces punched through said die apertures and having a portion aligned with one of said die apertures providing a discharge opening for one of said pieces, and means rotatable about said center and engaging the remaining pieces to effect sequential movement thereof to said discharge opening following movement of said platens toward each other.

2. Apparatus for working strip material, comprising a blanking die having a predetermined number of punches and respective die recesses arranged to blank the same number of blanks from a strip of sheet metal in staggered and nested relation to minimize scrap, a press having a reciprocating slide going through one stroke in an operation on a blank interposed between the die parts carried by said slide and the base of the press, means coordinating operation of said blanking die with said reciprocating slide and including an interconnection whereby said blanking die operates once and is then held idle until said slide has gone through a number of strokes equal to the number of blanks formed in each operation of said blanking die, collecting means for collecting the blanks punched in each operation of said blanking die, and a carrier adjacent to said collecting means operating in synchronization with each reciprocation of said slide.

3. The construction according to claim 2 wherein three blanks are punched from the metal strip during each operation of said blanking die, and said slide has three strokes to each operation of said blanking die.

4. Apparatus for working sheet metal, comprising a blanking die having a predetermined number of punches and respective die recesses arranged to simultaneously blank the same number of blanks from a strip of sheet metal in staggered and nested relation to minimize scrap, said blanks falling by gravity through the lower ends of said die recesses, collecting means beneath said blanking die and arranged to collect all but one of the blanks formed during blanking operation, said collecting means having an exit opening in alignment with one die recess so that one blank falling from such recess falls through said exit opening, a carrier beneath said collecting means and arranged to receive said one of the blanks falling from said exit opening, and means within said collecting means to eject the remaining blanks therefrom one at a time through said exit opening and onto the carrier in sequence with the movement of said carrier.

5. The construction according to claim 4 wherein said carrier reciprocates in timed relation with the reciprocation of the slide of a press, said carrier moving to and from its position beneath said collecting means for each reciprocation of said slide, and means coordinating operation of said blanking die with reciprocation of said slide whereby said blanking die operates once and then remains idle until said slide has reciprocated a number of times equal to the number of blanks formed during one operation of said blanking die.

References Cited in the file of this patent

UNITED STATES PATENTS

| | | |
|---|---|---|
| 187,267 | Gould et al. | Feb. 13, 1877 |
| 604,392 | Hogaboom | May 24, 1898 |
| 1,369,921 | Erhard | Mar. 1, 1921 |
| 1,462,094 | Walsh | July 17, 1923 |
| 1,626,977 | Sibley | May 3, 1927 |
| 1,725,300 | Pierson et al. | Aug. 20, 1929 |
| 2,012,423 | Ferris | Aug. 27, 1935 |
| 2,361,687 | Hermani | Oct. 31, 1944 |
| 2,533,914 | Brandt | Dec. 12, 1950 |
| 2,576,328 | Allison | Nov. 27, 1951 |
| 2,640,541 | Yates | June 2, 1953 |
| 2,679,816 | Moore | June 1, 1954 |

FOREIGN PATENTS

| | | |
|---|---|---|
| 204,187 | Germany | Jan. 22, 1908 |
| 510,651 | Germany | Oct. 22, 1930 |
| 551,678 | Germany | June 3, 1932 |